May 22, 1923.

T. E. WARE

TIRE

Filed May 20, 1922

Inventor
THOMAS E. WARE,
By Watson E. Coleman
Attorney

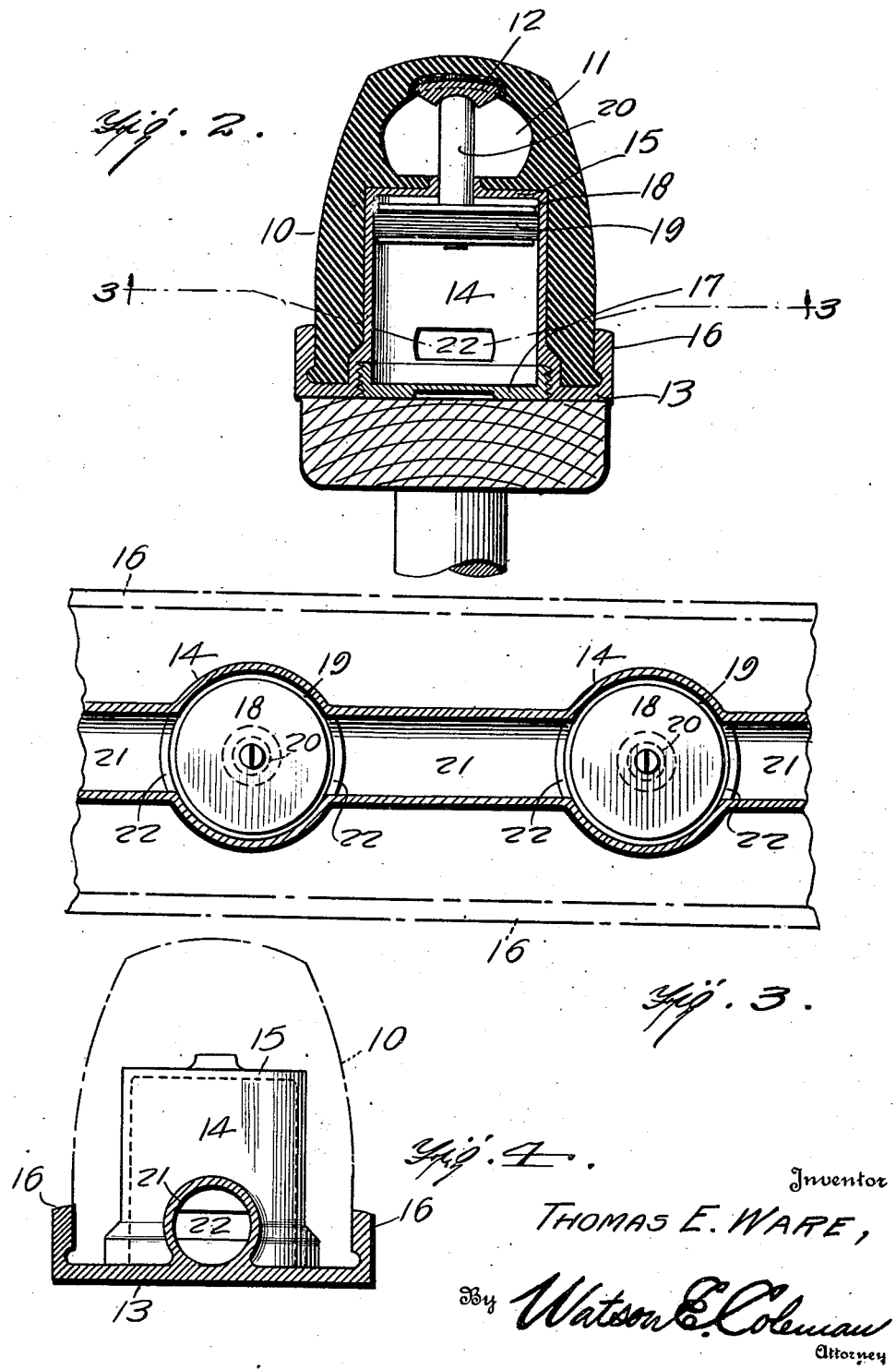

Patented May 22, 1923.

1,456,202

UNITED STATES PATENT OFFICE.

THOMAS E. WARE, OF LITTLE ROCK, ARKANSAS, ASSIGNOR OF ONE-SIXTH TO JAMES K. RIFFEL, ONE-SIXTH TO FRANK H. DODGE, ONE-SIXTH TO JAMES M. STEWART, AND ONE-HALF TO ELVA WARE, ALL OF LITTLE ROCK, ARKANSAS.

TIRE.

Application filed May 20, 1922. Serial No. 562,362.

*To all whom it may concern:*

Be it known that I, THOMAS E. WARE, a citizen of the United States, residing at Little Rock, in the county of Pulaski and State of Arkansas, have invented certain new and useful Improvements in Tires, of which the following is a specification, reference being had to the accompanying drawings.

This invention relates to improvements in tires, and more particularly to a puncture proof tire.

An important object of the invention is to provide a tire of this character which may be readily constructed and which will fit a standard wheel rim.

A further object of the invention is to provide a tire which while pneumatically cushioned, is so constructed as to prevent all likelihood of punctures or blow outs.

An additional object of the invention is to provide a device of this character which is simple in construction and arrangement, durable in service, and a general improvement in the art.

These and other objects I attain by the construction and arrangement shown in the accompanying drawings wherein for the purpose of illustration is shown a preferred embodiment of my invention and wherein like reference characters designate like parts throughout.

In the drawings:

Figure 2 is a section on the line 2—2 of Figure 1;

Figure 3 is a section on the line 3—3 of Figure 2;

Figure 4 is a transverse sectional view taken through the tire; and

Figure 1:
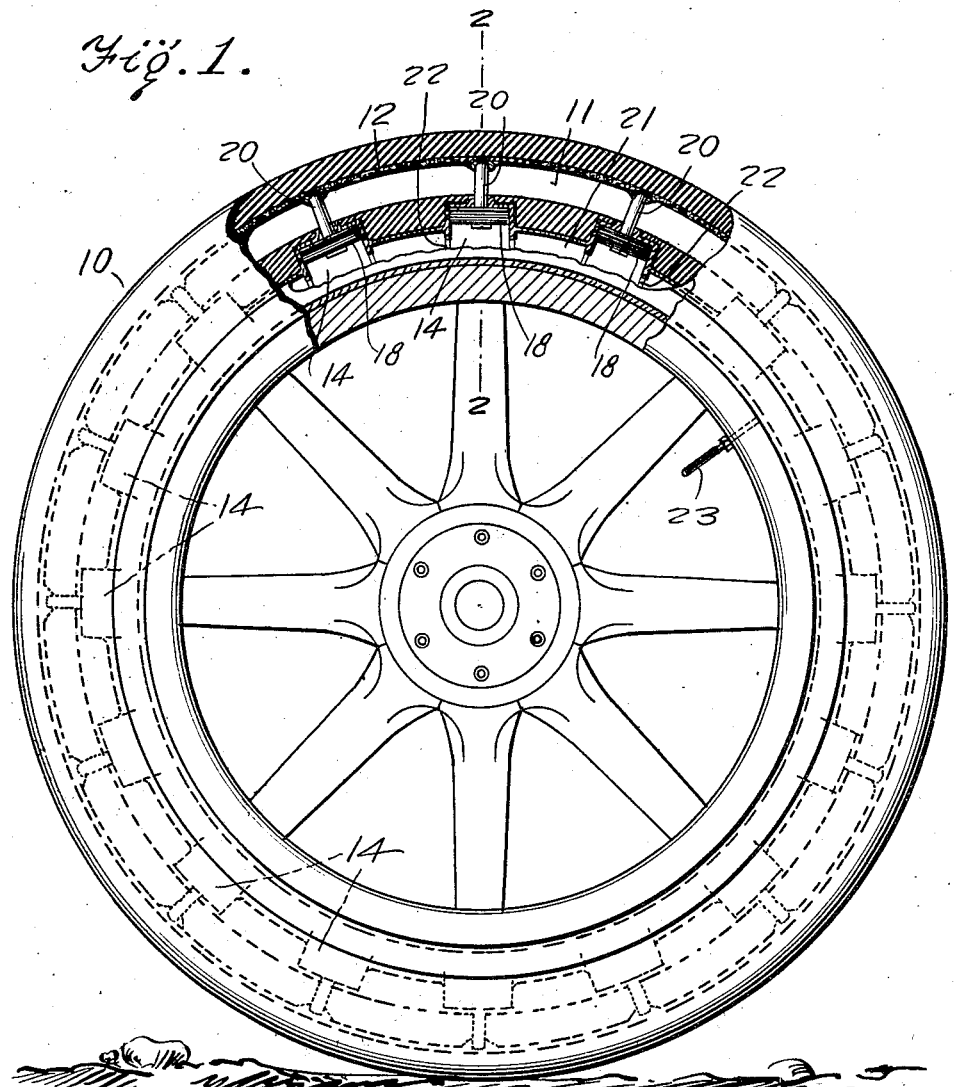
Figure 1 is a side elevation partially in section showing a tire constructed in accordance with my invention.
Figure 5:
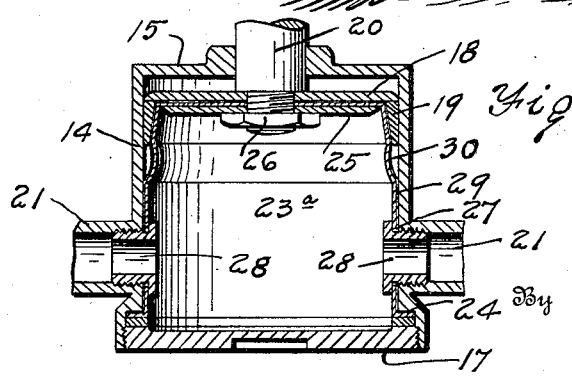
Figure 5 is a vertical section taken through one of the pistons and showing the use of a flexible lining therein.

Referring now more particularly to the drawings, the numeral 10 designates the tire proper which is provided in its interior adjacent its periphery with an annular recess 11 against the upper or outer wall of which, and opposing the tread, is disposed a strengthening band of fabric 12 having secured thereto spaced cups 12$^a$.

The numeral 13 designates a plate having extending upwardly therefrom at spaced intervals, cylinders 14, the outer ends of which are closed, as designated at 15. The inner ends, or those ends of the cylinders which will be disposed next adjacent the felly 16 of the wheel to which the tire is attached, are closed by removable plates 17 which when removed permit access to the interior of the cylinders. These cylinders are arranged at spaced intervals to the tire and each have mounted therein a piston 18 having packing, such as leather, as indicated at 19, for engagement with the walls of the cylinders. Each piston has its stem 20 directed through an opening formed in the upper end 15 of the cylinder and abutting against the cups 12$^a$.

It will be seen that upon compression of the tire, one or more of the pistons of the cylinders will be moved inwardly by engagement of the cups 12$^a$ therewith. This is due to collapsing of the side walls of the annular recess under the action of the weight of the vehicle upon the wheels of which the tire is being employed.

Adjacent portions of the cylinders are connected by passageways 21 communicating with the interior of the cylinders adjacent the inner ends thereof by means of ports 22. All of these channelways are in communication with an air inlet valve 23 by means of which a desired pressure may be placed against the pistons within their cylinders.

In the use of the tire the same is inflated to the desired pressure and this pressure bearing against the inner faces of the pistons tends to hold the tread outwardly against the action of roughness of the road. When an obstruction is encountered, the pistons will move inwardly against the pressure and will be cushioned thereby, giving to the tread a pneumatic cushion without the danger of the air forming the cushion being released by a cut in the tread.

If desired a lining may be provided for each of the cylinders 14 which is sealed to the cylinder and to the piston, and which lining is in communication with the passages 21. In the present instance I have shown the piston 18 affording means for securing thereto the cup leather 19 and for likewise securing thereto the lining 23$^a$. This lining is preferably formed of rubber or some other expansible material and has its lower end out-turned, as indicated at 24, for engagement and maintenance in position by the removable head plate 17. The upper end of the lining is held in position against the piston 18 by means of a clamping plate 25 and nut 26. In the side walls of the lining at points corresponding with the entrance points of the passages 21, openings 27 are formed in the lining permitting insertion therethrough of packing nuts 28 which will clamp against the lining and form an air tight joint. It will be seen that this lining may be inflated by employing the air valve 23 and that in its inflation it will force the piston upwardly. It will furthermore be obvious that the flexible seal thus provided will effectually prevent the leakage of the air and at the same time permit movement of the piston within the cylinder. If desired, the lining may be provided with a covering of canvas 29, or the like, which is drawn in immediately below the inner edges of the packing element 19 of the cylinder so that the walls thereof will tend to buckle inwardly at 30, and permit ready movement of the piston.

It will be obvious that even though the tread be cut through to the annular channel 11 no loss will result in the cushioning effect of the tire and that if any of the pistons become inefficient through continued use or are destroyed by an accident, the removable plate sections covering the inner end of the cylinder within which the piston is disposed may be removed and the piston either repaired or substituted for by a new piston. It will furthermore be obvious that the construction as hereinbefore set forth is capable of some change and modification without materially departing from the spirit of my invention and I accordingly do not limit myself thereto except as hereinafter claimed.

I claim:—

1. A solid tire provided interiorly with an annular passageway, metallic cups engaged against the outer wall of the passageway, radially extending cylinders spaced within said tire and having integral outer walls each provided with an opening, pistons mounted within the cylinders and having stems inserted through said openings and engaging said cups, said cylinders communicating one with the other, and an inflating valve for admitting air to said cylinders, the inner ends of said cylinders being removable to permit withdrawal of the pistons and the stems thereof, said tire being unremovably connected with said cylinders and cups.

2. A solid tire provided interiorly with an annular passageway, metallic cups engaged against the outer wall of the passageway, radially extending cylinders spaced within said tire, pistons mounted within the cylinders and having stems engaging said cups, said cylinders communicating one with the other, an inflating valve for admitting air to said cylinders, a plate secured to the inner face of the tire and to which said cylinders are attached, and removable cylinder heads carried by said plate and closing the inner ends of said cylinders.

3. A solid tire provided interiorly with an annular passageway, metallic cups engaged against the outer wall of the passageway, radially extending cylinders circumferentially spaced within said tire, pistons mounted within the cylinders and having stems engaging said cups, flexible linings for said cylinders having their upper ends secured to said pistons, a plate secured to the inner face of said tire and to which said cylinders are attached and through which the inner ends of the cylinders open, removable cylinder heads carried by said plate closing the inner ends of said cylinders and maintaining the lower ends of said flexible linings in position, connections between said flexible linings, and an inflating valve communicating with one of said connections.

In testimony whereof I hereunto affix my signature.

THOMAS E. WARE.